United States Patent
Fukaya et al.

(10) Patent No.: US 8,050,654 B2
(45) Date of Patent: Nov. 1, 2011

(54) METHOD FOR LOCKING FUNCTION AND MOBILE COMMUNICATION TERMINAL

(75) Inventors: Masato Fukaya, Tokyo (JP); Ryota Tamura, Tokyo (JP); Aiko Matsuda, Tokyo (JP)

(73) Assignee: Vodafone Group PLC, Newbury, Berkshire (GB)

( * ) Notice: Subject to any disclaimer, the term of this patent is extended or adjusted under 35 U.S.C. 154(b) by 1054 days.

(21) Appl. No.: 11/907,446

(22) Filed: Oct. 12, 2007

(65) Prior Publication Data

US 2008/0076394 A1    Mar. 27, 2008

Related U.S. Application Data

(63) Continuation of application No. PCT/JP2006/308585, filed on Apr. 24, 2006.

(30) Foreign Application Priority Data

Apr. 25, 2005    (JP) .................................. 2005-126094

(51) Int. Cl.
*H04M 1/66* (2006.01)
*H04B 7/00* (2006.01)
*H04L 29/06* (2006.01)

(52) U.S. Cl. .................... 455/410; 455/528; 713/166

(58) Field of Classification Search .............. 455/419, 455/411, 558, 410, 528; 707/10; 705/51
See application file for complete search history.

(56) References Cited

U.S. PATENT DOCUMENTS

| | | | | |
|---|---|---|---|---|
| 5,987,609 | A * | 11/1999 | Hasebe | 726/35 |
| 2001/0004591 | A1 * | 6/2001 | Jeong | 455/419 |
| 2002/0010698 | A1 * | 1/2002 | Shin et al. | 707/10 |
| 2003/0120500 | A1 * | 6/2003 | Deeds et al. | 705/1 |
| 2004/0203601 | A1 * | 10/2004 | Morriss et al. | 455/411 |
| 2006/0058064 | A1 * | 3/2006 | Satou | 455/558 |

FOREIGN PATENT DOCUMENTS

| | | |
|---|---|---|
| JP | 2001-223631 | 8/2001 |
| JP | 2002-209260 | 7/2002 |
| JP | 2002-281148 | 9/2002 |
| JP | 2003-85466 | 3/2003 |
| JP | 2004-348475 | 12/2004 |

* cited by examiner

*Primary Examiner* — Kiet Doan
(74) *Attorney, Agent, or Firm* — Kratz, Quintos & Hanson, LLP

(57) ABSTRACT

A user of a mobile communication terminal registers a title or test body that a lock request electronic mail should have for locking function of a contactless type communication device is a lock control information area 23R of the mobile communication terminal. After that, if a lock request electronic mail having the registered title is received, and the lock request electronic mail is detected by the lock request detection section 51, then when the contactless type communication device is in a usable state, in the mobile communication terminal the function lock section 52 within the control section locks the function of the contactless type communication device via the wired communication path.

11 Claims, 14 Drawing Sheets

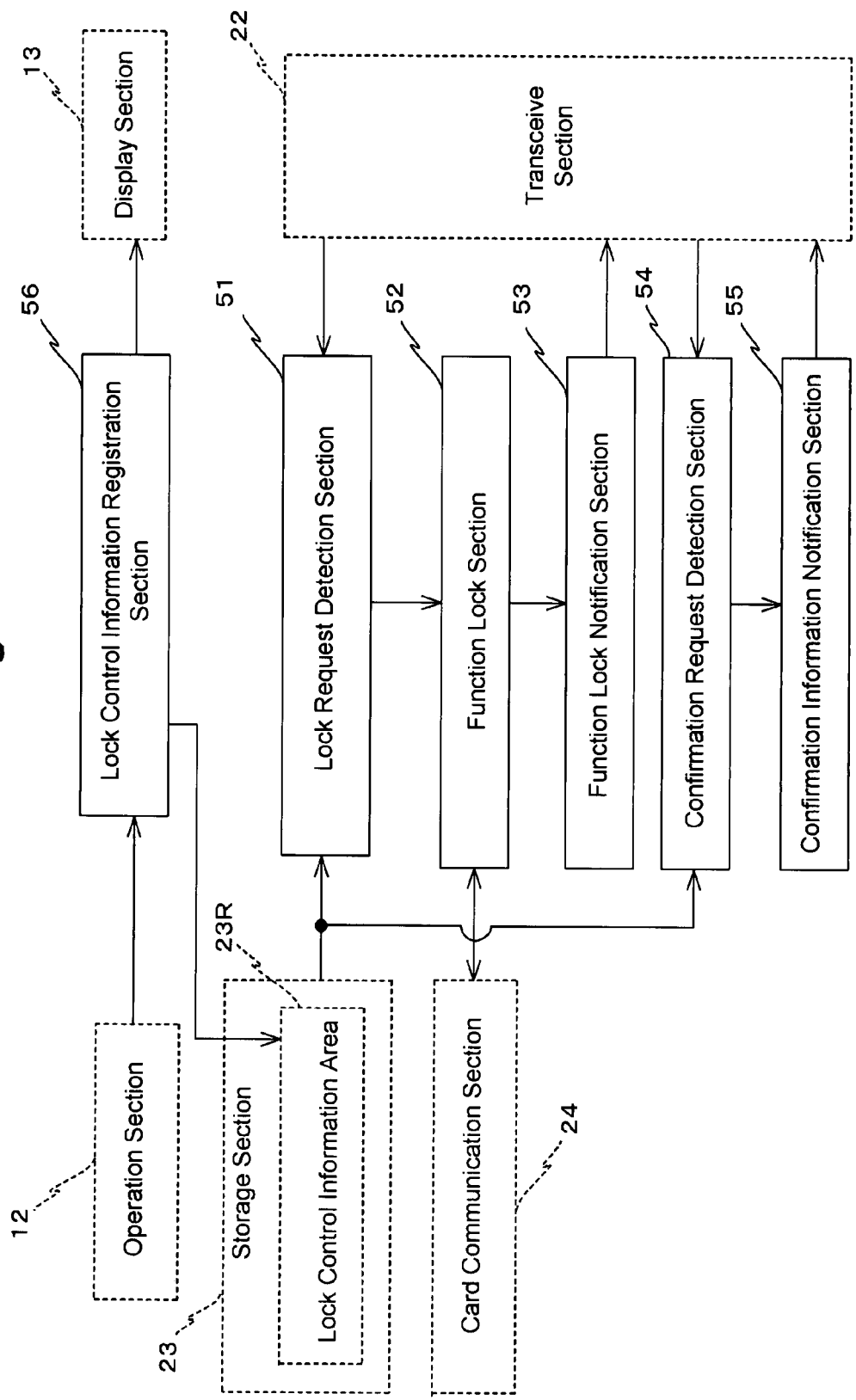

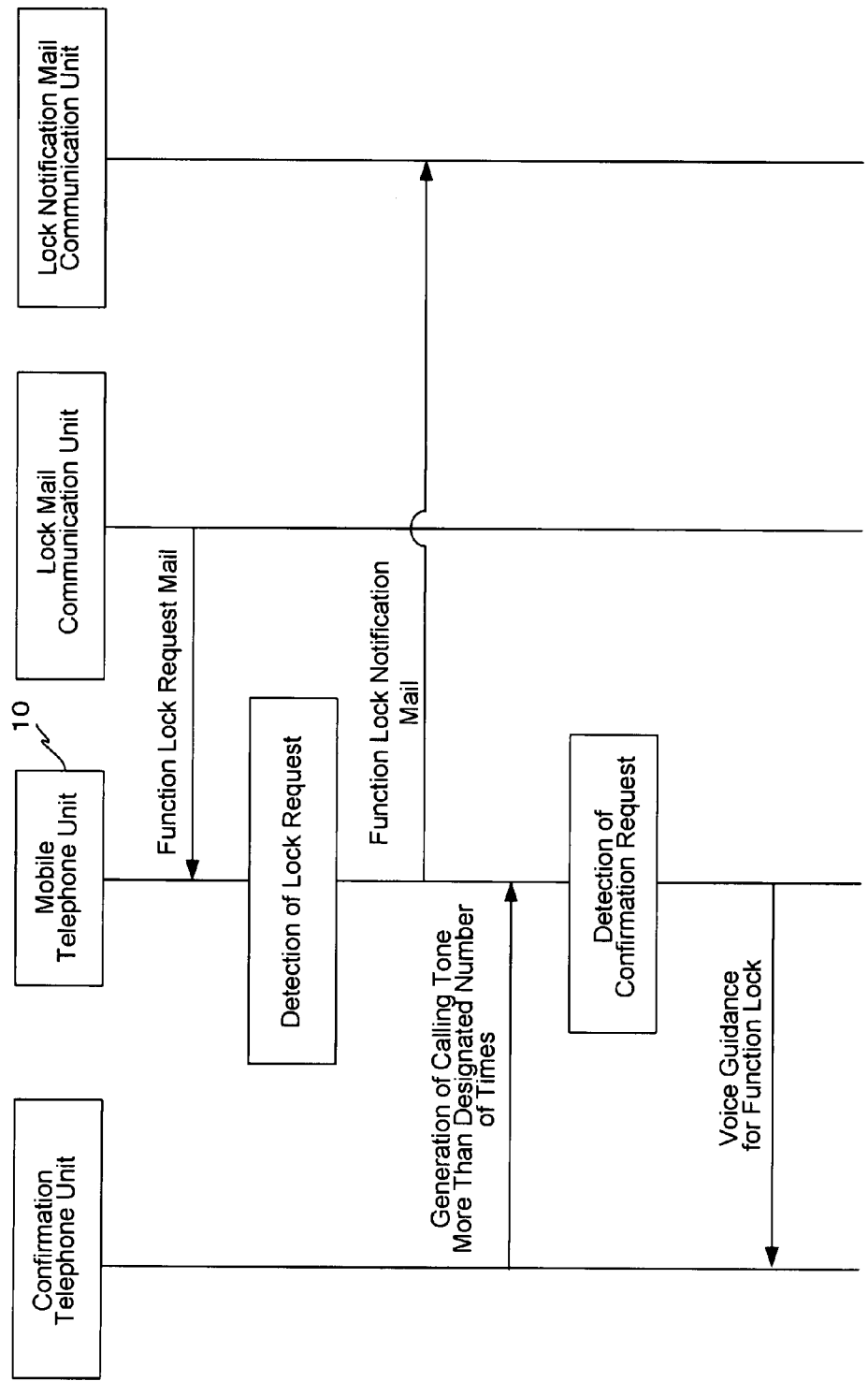

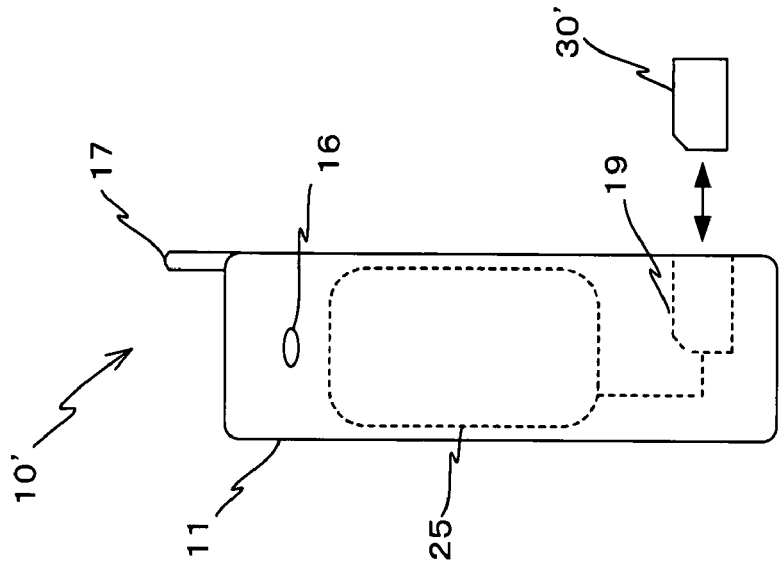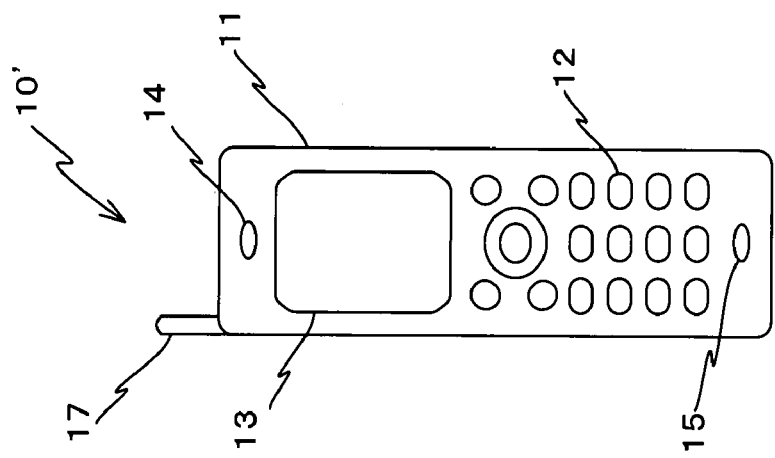

METHOD FOR LOCKING FUNCTION AND MOBILE COMMUNICATION TERMINAL

RELATED APPLICATION

This is a continuation application of the international patent application No. PCT/JP2006/308585 filed with Application date: Apr. 24, 2006. The present application is based on, and claims priority from, J.P. Application 2005-126094, filed on Apr. 25, 2005, the disclosure of which is hereby incorporated by reference herein its entirety.

BACKGROUND OF THE INVENTION

The present invention relates to a method for locking and stopping function and a mobile communication terminal, and in more detail relates to a method for locking function for a contactless type communication device, in the mobile communication terminal fitted with the contactless type communication device capable of function lock control via a wired communication path, and to a mobile communication terminal using the method for locking function.

BACKGROUND ART

Mobile communication terminals such as cellular phones have become widespread in recent years. With cellular phones, for example, that have seen remarkable improvements in the functions and performance of these type of mobile communication terminals, devices are being introduced that are provided with contactless type communication devices that perform contactless type communication in addition to necessary functions such as a call function and an e-mail transceiving function, and also fulfill a so-called IC-card function which has become widely used in recent years. As such contactless type communication devices, there are those that are card shaped, such as a so-called IC card, that are capable of being inserted into a mobile communication terminal (refer to patent document 1), and those that are fixedly built into a mobile communication terminal (refer to patent document 2).

These types of contactless communication devices contain IC chips such as a CPU (central processing unit) chip or a memory chip. Such contactless type communication devices have a high degree of security, and as a result, are gradually being used for functions that are important to an individual, such as storing financial transaction type information that should not easily be made available to others, for example, prepaid rail card usage history and electronic money.

With mobile communication terminals fitted with a contactless type communication device, it is generally possible for a user to arbitrarily lock a function of the contactless type communication device by issuing a command from an operating section of the mobile communication terminal. Technology has also been implemented where, in locking the function of the contactless type communication device, in the event that a portable information terminal fitted with the contactless type communication device is lost, the functions of the contactless type communication device are locked by means of a remote operation via a mobile communications network (hereafter referred to as "remote function lock" or "remote lock"). For example, technology has been implemented to carry out a request for remote function lock by carrying out a call originating operation satisfying specified condition from a telephone unit other than the mobile communication terminal to the mobile communication terminal fitted with the contactless type communication device. In this case, as the "originating operation satisfying specified conditions", there is generating a calling tone a specified number of times or more than a specified number of times.

Patent publication 1: Japanese patent laid-open No. 2001-223631
Patent publication 2: Japanese patent laid-open No. 2003-85466

SUMMARY OF THE INVENTION

The above-described remote function lock technology using a call originating operation satisfying specified conditions is excellent for handling situations such as loss of the mobile communication terminal. However, conventionally, it is not possible to perform a remote function lock using the call origination operation in the event that a person coming across a mobile communication terminal that has been lost by a user has set incoming call reject using an incoming call reject function that is normally implemented in recent cellular phones.

Therefore, with the conventional remote function lock technology, there are cases where it is not possible to prevent use of the contactless type communication device function by a person finding the terminal acting in bad faith. This means that there is a possibility of the user of the mobile communication terminal sustaining heavy losses.

The present invention has been made in view of the aforementioned situation, and it is the object of the present invention to provide a method for locking function capable of carrying out a function lock of a contactless type communication device contained in a mobile communication terminal with high reliability.

Another object of the present invention is to provide a mobile communication terminal capable of carrying out function lock of a fitted contactless type device with high reliability.

A first aspect of the present invention is directed to a method for locking function for a contactless type communication device of a mobile communication terminal fitted with the contactless type communication device that is capable of function lock control via a wired communication path, comprising a lock request electronic mail content registration step in which a user of the mobile communication terminal registers, inside the mobile communication terminal, content that at least one of a title field and a text body should have as a lock request electronic mail for locking function of the contactless type communication device, a function lock decision step for deciding, in the mobile communication terminal that has received the lock request electronic mail via a mobile communication network, whether or not the contactless type communication device is in a function lock state, and a function lock state for, when the decision result in the function lock decision step is negative, locking the function of the contactless type communication device in the mobile communication terminal via the wired communication path.

With this method for locking function, first of all, in the lock request electronic mail content registration step, the user of the mobile communication terminal registers, inside the mobile communication terminal, content that at least one of a title field and a text body should have as a lock request electronic mail for causing a remote function lock. If a lock request electronic mail having this registered content is received, the mobile communication terminal decided whether or not the contactless type communication device is in a function locked state in the function lock decision step. In the event that the decision result is negative, namely that the contactless type communication device is in a usable state, then in the function lock step, the function of the contactless type communication device is locked via the wired communication path.

Therefore, function of contactless type communication device can be locked by a remote operation even if incoming call reject is set in the mobile communication terminal that has been lost. Therefore, according to the method for locking function capable of the present invention, it is possible to carry out a function lock of a contactless type communication device contained in a mobile communication terminal with high reliability when the user of the mobile communication terminal intends to.

With the method for locking function of the present invention, it is possible to further comprise a notified party registration decision step for, when the decision result in the function lock decision step is affirmative, or when the function lock step has been executed, deciding whether or not a function notified party who should be notified of function lock information to the effect that the contactless type communication device is in a function locked state, is registered in the mobile communication terminal, and a function lock notification step in which, when the decision result in the notified party registration decision step is affirmative, the mobile communication terminal notifies the function lock information to the function lock notified party via the mobile communication network.

In this case, when the decision result in the function lock decision step is affirmative, or when the function lock step has been executed, it is decided in the notified party registration decision step whether or not a function notified party who should be notified of function lock information to the effect that the contactless type communication device is in a function locked state, is registered in the mobile communication terminal. If this decision result is affirmative, then in the function lock notification step the mobile communication terminal notifies the function lock information to the function lock notified party via a mobile communication network. As a result, if the function lock notified party is registered, it is possible for the user of the mobile communication terminal to know that the function of the contactless type communication device provided in the mobile communication terminal has been locked by referring to the communication terminal of the function lock notified party.

In this case, the function lock notified party is made a terminal capable of receiving electronic mail, and the function lock information can be notified from the mobile communication terminal to the function lock notified party using electronic mail. In this case, since the function lock information is notified to the function lock notified party using electronic mail, the function lock information can be reliably sent to the function lock notified party.

Also, with the method for locking function of the present invention, it is possible to further comprise a lock confirmation request step for carrying out, in the mobile communication terminal, a confirmation request for lock of the function from a confirmation terminal via a mobile communications network, and a confirmation information transmission step in which the mobile communication terminal sends confirmation information, with content that the function of the contactless type communication device is locked, to the confirmation terminal in response to the confirmation request, when the function of the contactless type communication device is in a locked state.

In this case, in the lock confirmation request step, if, in the mobile communication terminal, a confirmation request for lock of the function of the contactless type communication terminal from a confirmation terminal is executed via a mobile communications network, then when the function of the contactless type communication device is locked, in the confirmation information transmission step the mobile communication terminal transmits confirmation information with content that the function of the contactless type communication terminal is locked to the confirmation terminal as a response to the confirmation request. As a result, after function lock of the contactless type communication device, the user of the mobile communication terminal can confirm that the function of the contactless type communication device is locked in the confirmation terminal used for the confirmation request.

In this case, the confirmation terminal can be a communication terminal having an identifier for a confirmation request possible originator pre-registered in the mobile communication device. In this case, as a result of the user setting a home telephone, public telephone, home personal computer, and so forth as a confirmation lock terminal in the mobile communications terminal in advance and registering identifiers such as phone numbers or electronic mail addresses of these devices, it is possible to ensure the convenience to the user while appropriately restricting the confirmation request possible terminal.

It is also possible for the confirmation terminal to have at least one calling telephone unit, and for the mobile communication terminal to recognize that the confirmation request has been received upon detection of generation of a calling tone more than a specified number of times after a call is received from the at least one calling telephone unit. In this case, it is possible to confirm that function of a contactless type communication device provided in a mobile communication terminal that has been lost has been locked by the simple operation of generating a calling tone more than a specified number of times using a calling telephone unit such as a home telephone or a public telephone.

In this case, it is possible to make the confirmation information a voice message. In this case, the confirmation information is notified to the confirmation terminal in a form that is easy for the user to comprehend.

A second aspect of the present invention is directed to a mobile communication terminal, fitted with a contactless type communication device capable of function lock control via a wired communication path, comprising lock request electronic mail content registration means for registering, in a function lock control information area within a storage section, content that at least one of a title field and a text body should have as a lock request electronic mail for locking function of the contactless type communication device, in response to an instruction from a user of the mobile communication terminal, function lock decision means for deciding, when the lock request electronic mail has been received via a mobile communication network, whether or not the contactless type communication device is in a function lock state, and function lock means for, when the decision result by the function lock decision means is negative, locking the function of the contactless type communication device via the wired communication path.

With this mobile communication terminal, the lock request electronic mail content registration means registers content that at least one of a title field and a text body should have as a lock request electronic mail for causing a remote function lock in a function lock control information area within the storage section, in response to an instruction from the user. If a lock request electronic mail having this registered content is received, the function lock decision means decides whether or not the contactless type communication device is in a function locked state. In the event that this decision result is negative, the function lock means locks the function of the contactless type communication device via the wired communication path.

Namely, with the mobile communication terminal of the present invention it is possible to perform function lock control for a contactless type communication device using the method for locking function of the present invention described above. Therefore, with the mobile communication terminal of the present invention it is possible to carry out function lock of a fitted contactless type device with high reliability.

With the mobile communication terminal of the present invention, it is possible to further provide function lock notification means for, in the event that the result of decision by the function lock decision means is affirmative, or in the event that the function of the contactless type communication device has been locked by the function lock means, when a function lock notified party who should be notified with function lock information to the effect that the contactless type communication device is in a function locked state is registered in the function lock control information area, notifying the function lock information to the function lock notified party via the mobile communication network.

In this case, when a function lock notified party who should be notified with function lock information to the effect that the contactless type communication device is in a function locked state is registered in the function lock control information area, in the event that the result of decision by the function lock decision means is affirmative, or in the event that the function of the contactless type communication device has been locked by the function lock means, the function lock notification means notifies the function lock information to the function lock notified party via the mobile communication network. As a result, if the function lock notified party is registered, it is possible for the user of the mobile communication terminal to know that the function of the contactless type communication device provided in the mobile communication terminal has been locked by referring to the communication terminal of the function lock notified party.

Also, with the mobile communication terminal of the present invention, it is possible to further provide lock confirmation request detection means for detecting receipt of a confirmation request for lock of the function from a confirmation terminal via the mobile communications network, and confirmation information transmission means for transmitting confirmation information, with content that the function of the contactless type communication device is locked, to the confirmation terminal in response to the confirmation request, when the contactless type communication device is in a function locked state.

In this case, if a confirmation request for function lock of the contactless type communication device from the confirmation terminal via the mobile communication network is carried out in the mobile communication terminal, the lock confirmation request detection means detects the confirmation request. Continuing on, in the event that function of the contactless type communication device is locked, the confirmation information transmission means transmits confirmation information with content that the function of the contactless type communication device is locked to the confirmation terminal in response to the confirmation request. As a result, after function lock of the contactless type communication device, the user of the mobile communication terminal can confirm that the function of the contactless type communication device is locked in the confirmation terminal used for the confirmation request.

In this case, it is possible to further register an identifier for the confirmation terminal in the function lock control information area. In this case, as a result of the user setting a home telephone, public telephone, home personal computer, and so forth as a confirmation lock terminal in the mobile communications terminal in advance and registering identifiers such as phone numbers or electronic mail addresses of these devices, it is possible to ensure the convenience to the user while appropriately restricting the confirmation request possible terminal.

It is also possible for the confirmation terminal to have at least one calling telephone unit, and for the lock confirmation request detection means to be provided with calling tone confirmation request detection means for confirming that there is a confirmation request upon detection of generation of a calling tone more than a specified number of times after a call has been received from the at least one calling telephone unit in a state where function of the contactless type communication device is locked. In this case, it is possible to confirm that function of a contactless type communication device provided in a mobile communication terminal that has been lost has been locked by the simple operation of generating a calling tone more than a specified number of times using a calling telephone unit such as a home telephone or a public telephone.

In this case, it is possible to have a configuration where voice guidance is transmitted by the confirmation information transmission means as the confirmation information. In this case, the confirmation information is notified to the confirmation terminal in a form that is easy for the user to comprehend.

As has been described above, according to the method for locking function of the present invention, the effect is achieved of being able to carry out a function lock of a contactless type communication device contained in a mobile communication terminal with high reliability.

Also, according to the mobile communication terminal of the present invention, the effect is achieved of making it possible to carry out function lock of a fitted contactless type device with high reliability.

BRIEF DESCRIPTION OF DRAWINGS

FIG. 3 is a drawing for describing the structure of software executed in the control section of FIG. 2A;

FIG. 11 is a sequence diagram for describing a remote function lock and function lock confirmation operation for the IC card function section of FIG. 2A;

FIG. 12A is a front view schematically showing the external structure of a cellular phone unit of a modified example;

FIG. 12B is a rear view schematically showing the external structure of a cellular phone unit of a modified example.

DETAILED DESCRIPTION

Figure 1B:
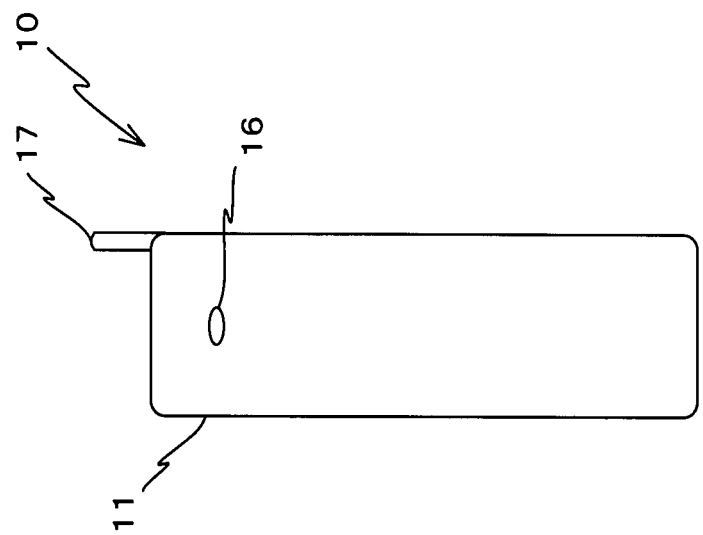
FIG. 1B is a rear view schematically showing the external structure of a cellular phone unit of one embodiment of the present invention.

One embodiment of the present invention will be described in the following with reference to FIG. 1A-FIG. 11. In these drawings, elements that are the same or equivalent have the same reference numerals assigned, and repeat description will be omitted.

Figure 1A:
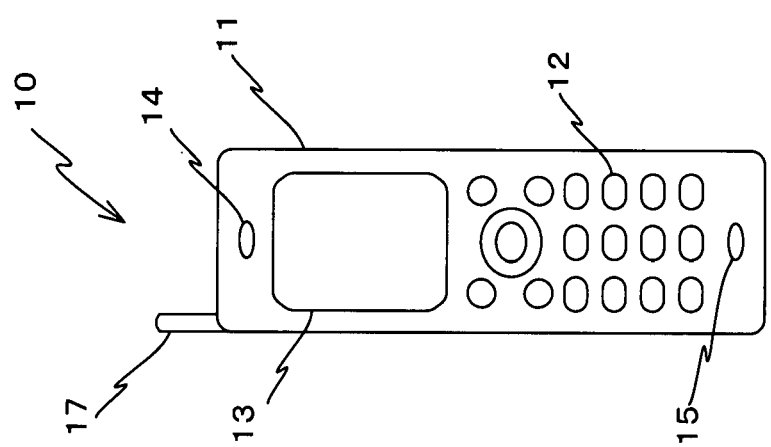
FIG. 1A is a front view schematically showing the external structure of a cellular phone unit of one embodiment of the present invention.

The external structure of the cellular phone unit 10, being a mobile communication terminal of one embodiment, is schematically shown FIG. 1A and FIG. 1B. In this embodiment, a front view of the external appearance of the cellular phone unit 10 is shown in FIG. 1A, and a rear view of the external appearance of the cellular phone unit 10 is shown in FIG. 1B.

As shown comprehensively in FIG. 1A and FIG. 1B, the cellular phone unit 10 comprises (a) a cellular phone body 11, (b) an operation section 12 having a numerical key pad for inputting telephone numbers and function keys for inputting various commands such as operational mode switching to a control section 21, (c) a screen display section 13 having a liquid crystal display for displaying operating guidance, operation conditions, received messages, and so forth, (d) a speaker for conversation 14 for reproducing voice signals transmitted from a communications partner at the time of a call, (e) a microphone 15 for inputting sound when collecting sound or inputting voice at the time of a call, (f) a guidance speaker 16 for generating calling tones and guidance tones, and (g) an antenna 17 for sending and receiving wireless signals between the telephone and a base station.

Figure 2A:
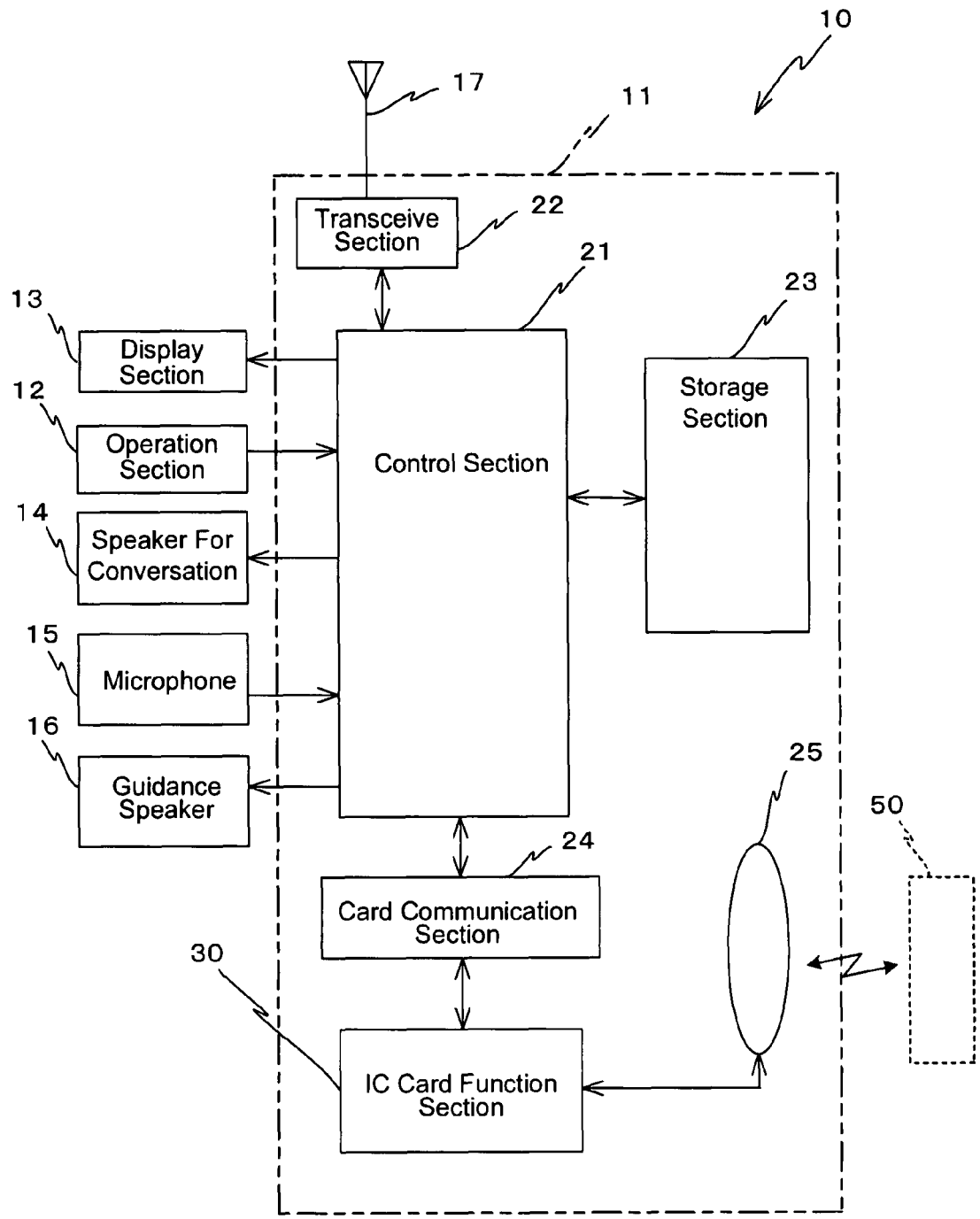
FIG. 2A is functional block diagram for describing the internal structure of the cellular phone unit of FIG. 1A and FIG. 1B.
Figure 2B:
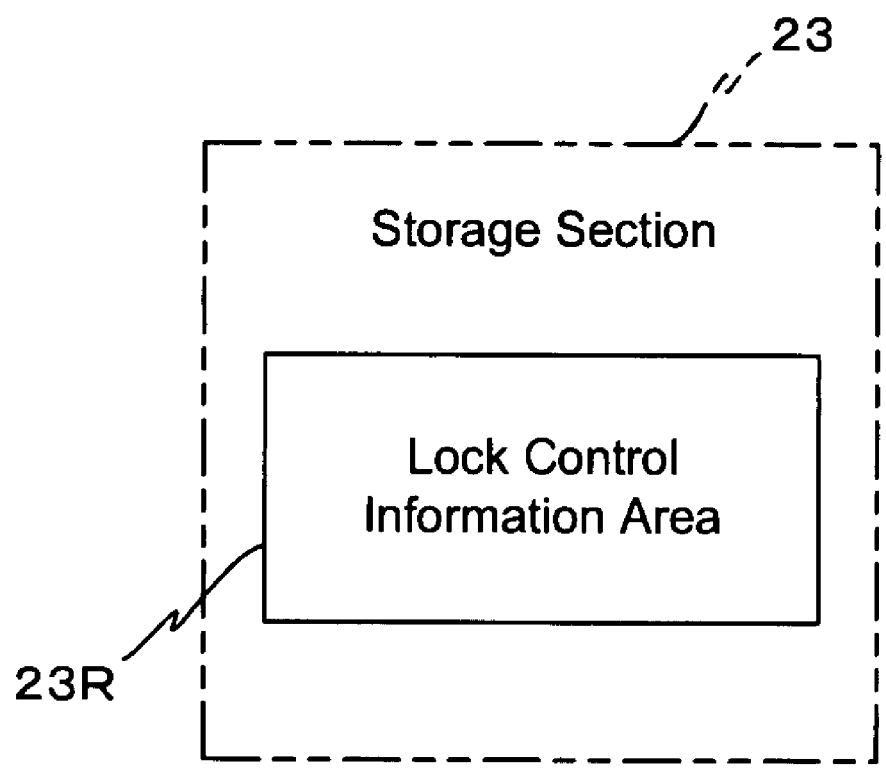
FIG. 2B is a drawing showing the structure of a storage section 23 in the functional block diagram for describing the internal structure of the cellular phone unit of FIG. 1A and FIG. 1B.

As shown in FIG. 2A and FIG. 2B, the cellular phone body 11 is internally provided with (i) a control section 21 for controlling overall operation of the cellular phone unit 10, (ii) a transceive section 22 for transceiving wireless signals between the telephone and a base station via the antenna 17, (iii) a storage area 23, having read only memory (ROM) elements and random access memory (RAM) elements for storing various data, and provided with a lock control information area 23R, (iv) an IC card function section 30 fulfilling an IC card function, (v) a card communication section 24 for the control section 21 to perform contact type communication with the IC card function section 30, and (vi) an antenna 25 for the IC card function section 30 to perform contactless type communication with a reader writer 50.

The control section 21 comprises a central processing unit (CPU), a digital signal processor (DSP), and so forth, for carrying out various data processing for implementing mobile general cellular phone functions, and for carrying out control of operations of other structural elements described above. Among the software such as programs executed on the control section 21, the structure of software groups related to remote function lock of the IC card function section 30 are as shown in FIG. 3.

Namely, the software group relating to remote function lock of the IC card function section 30 includes (i) a lock request detection section 51 for detecting a remote function lock request for the IC card function section 30 received via the transceive section 22 while appropriately referencing the storage section 23, (ii) a function lock section 52 for locking the function of the IC card function section 30 via the card communication section 24 when notification to the effect that a remote function lock request has been detected is received from the lock request detection section 51 during operation of the IC card function section 30, and (iii) a function lock notification section 53 for transmitting function lock information via the transceive section 22 while appropriately accessing the storage section 23 when notification to the effect that function of the IC card function section 30 has been locked in accordance with a remote function lock request from the function lock section 52.

In this embodiment, the lock request detection section 51 recognizes that there is a remote function lock request by receiving en electronic mail having content that has been registered in the lock control information area 23R. Incidentally with this embodiment, having a title registered in the lock control information area 23R is a condition of the electronic mail content for lock request.

The function lock notification section 53 transmits an electronic mail of predetermined content towards the lock notification electronic mail terminal having a mail address registered in the lock control information area 23R. In this embodiment, the mail content for a lock notification is stored in an area of the storage section 23 separately from the lock control information area 23R.

The software group relating to remote function lock for the IC card function section 30 also includes (iv) a confirmation request detection section 54 for detection a confirmation request for function lock of the IC card function section 30 that has been received via the transceive section 22, while appropriately referencing the storage section 23, (v) a confirmation information notification section 55 for transmitting confirmation information for a function lock via the transceive section 22, while appropriately referencing the storage section 23, when notification to the effect that a confirmation request for function lock has been detected is received from the confirmation request detection section 54 while the function of the IC card function section 30 is locked, and (vi) a lock control information registration section 56 for registering lock control information, input as a command from the operation section 12 by a user while looking at the screen of the display section 13, in the lock control information area 23R.

The confirmation request detection section 54 confirm that there is a confirmation request for the fact that function of the IC card function section 30 is locked upon generation of a calling tone more than a designated call tone number of times that is registered in the lock control information area 23R, after a call has been received from the confirming telephone unit having a telephone number registered in the lock control information area 23R. Also, the function lock notification section 53 transmits voice guidance as confirmation information for the fact that the function of the IC card function section 30 is locked towards the confirming telephone unit that is making a call. The content of the voice guidance is stored in an area of the storage section 23 separately from the lock control information area 23R.

Figure 4:
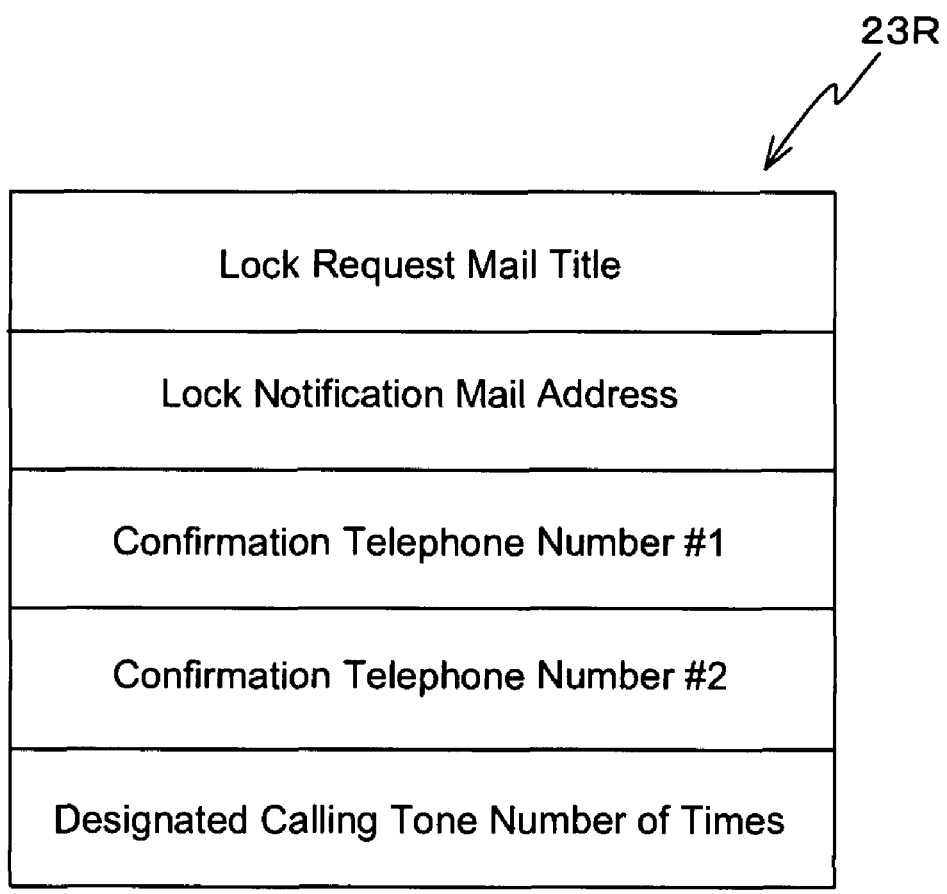
FIG. 4 is a drawing for describing the structure of a terminal registration table of FIG. 2A and FIG. 3.

As shown in FIG. 4, a lock request mail title that is the title that a function lock request mail for the IC card function section 30 should have can be registered in the lock control information area 23R. It is also possible to register a lock notification mail address, being an identifier for the lock notification electronic mail terminal constituting a lock notified party, in the lock control information area 23R. It is also possible to further register two types of telephone number, confirmation telephone numbers #1 and #2 as identifiers for confirmation telephone units, and a designated calling tone number of time, in the lock control information area 23R. Operation of information registration to the lock control information area 23R will be described later.

Figure 5:
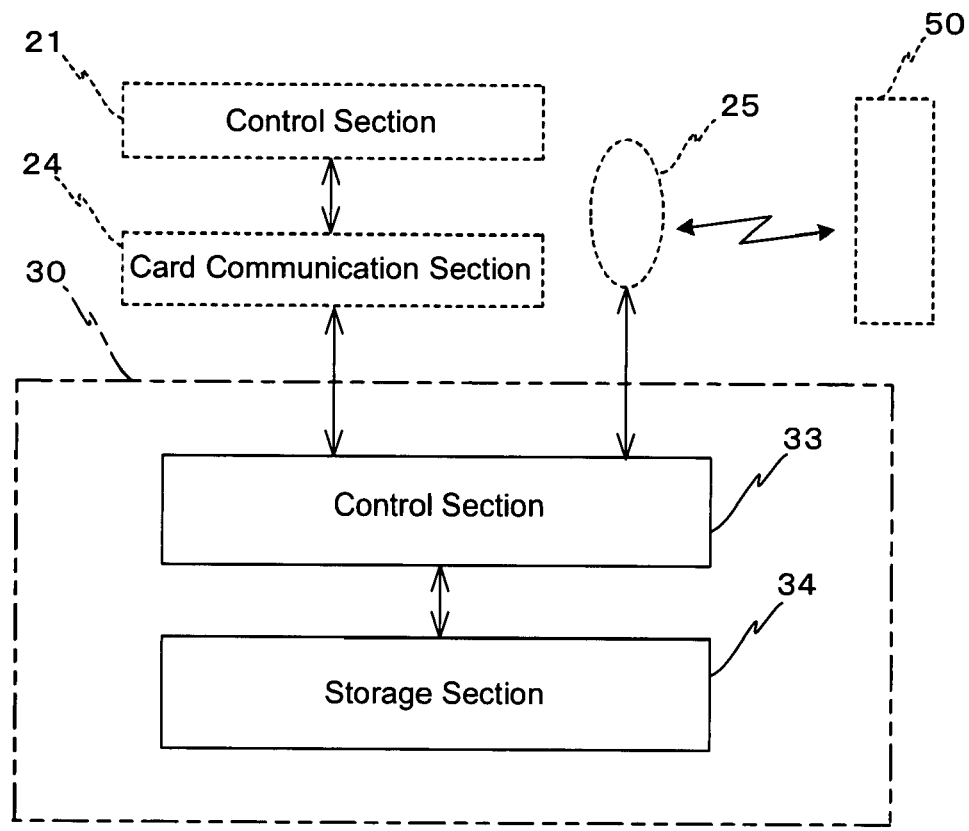
FIG. 5 is a functional block diagram showing the structure of an IC card function section of FIG. 2A.
Figure 6:
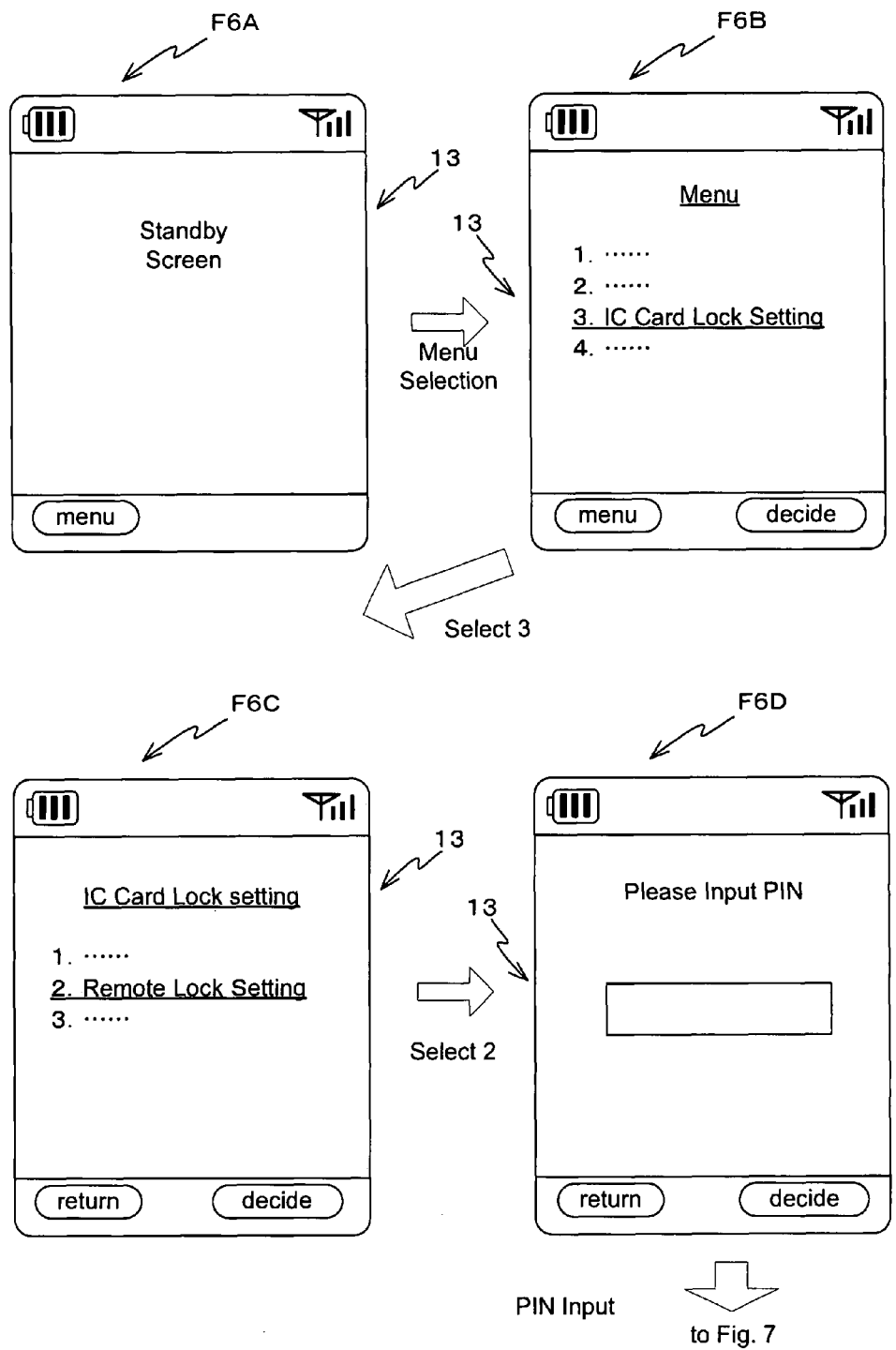
FIG. 6 is the first screen transition diagram for explaining an operation of registering to the lock control information area of FIG. 4.
Figure 7:
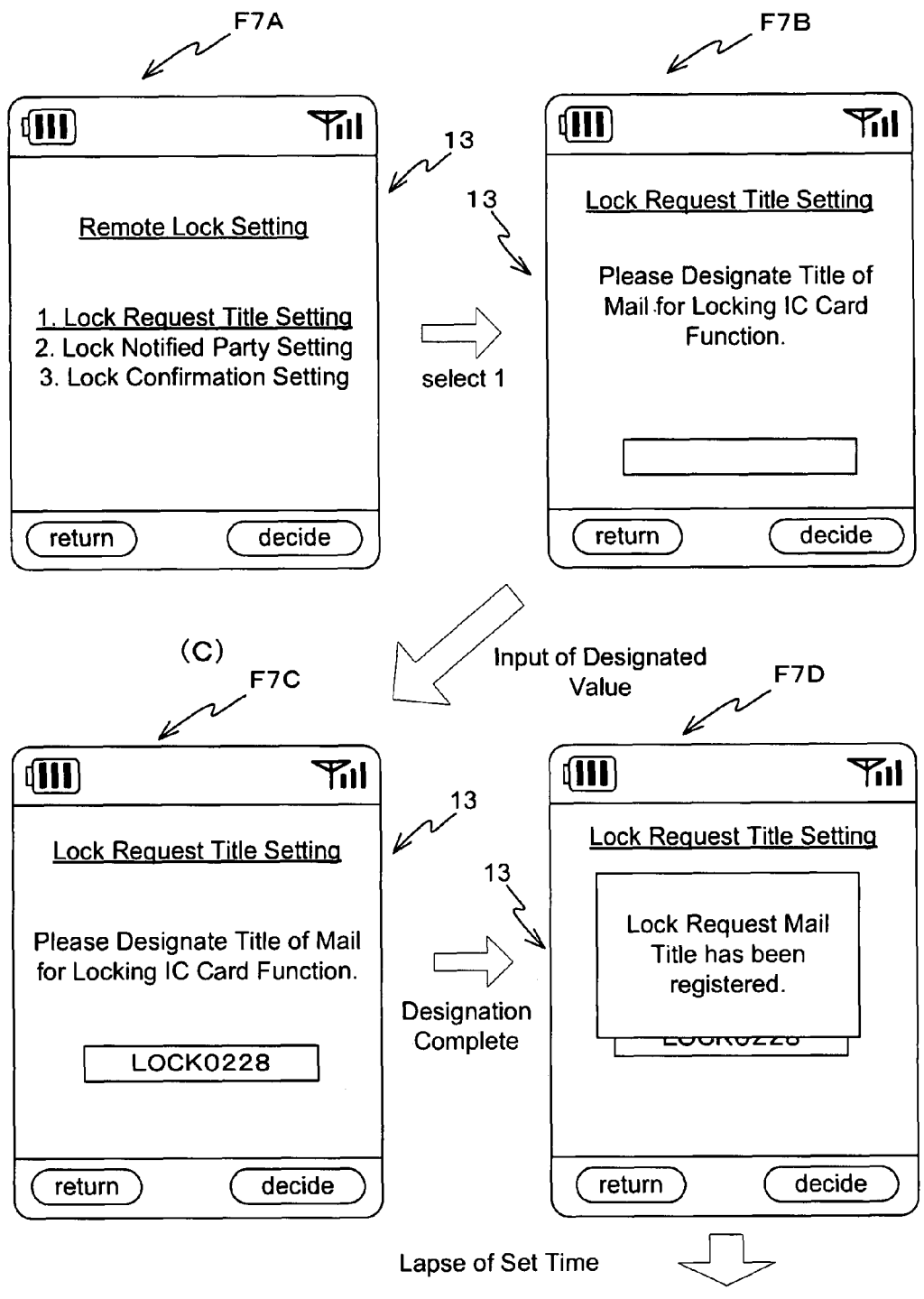
FIG. 7 is the second screen transition diagram for explaining an operation of registering to the terminal registration table of FIG. 4.
Figure 8:
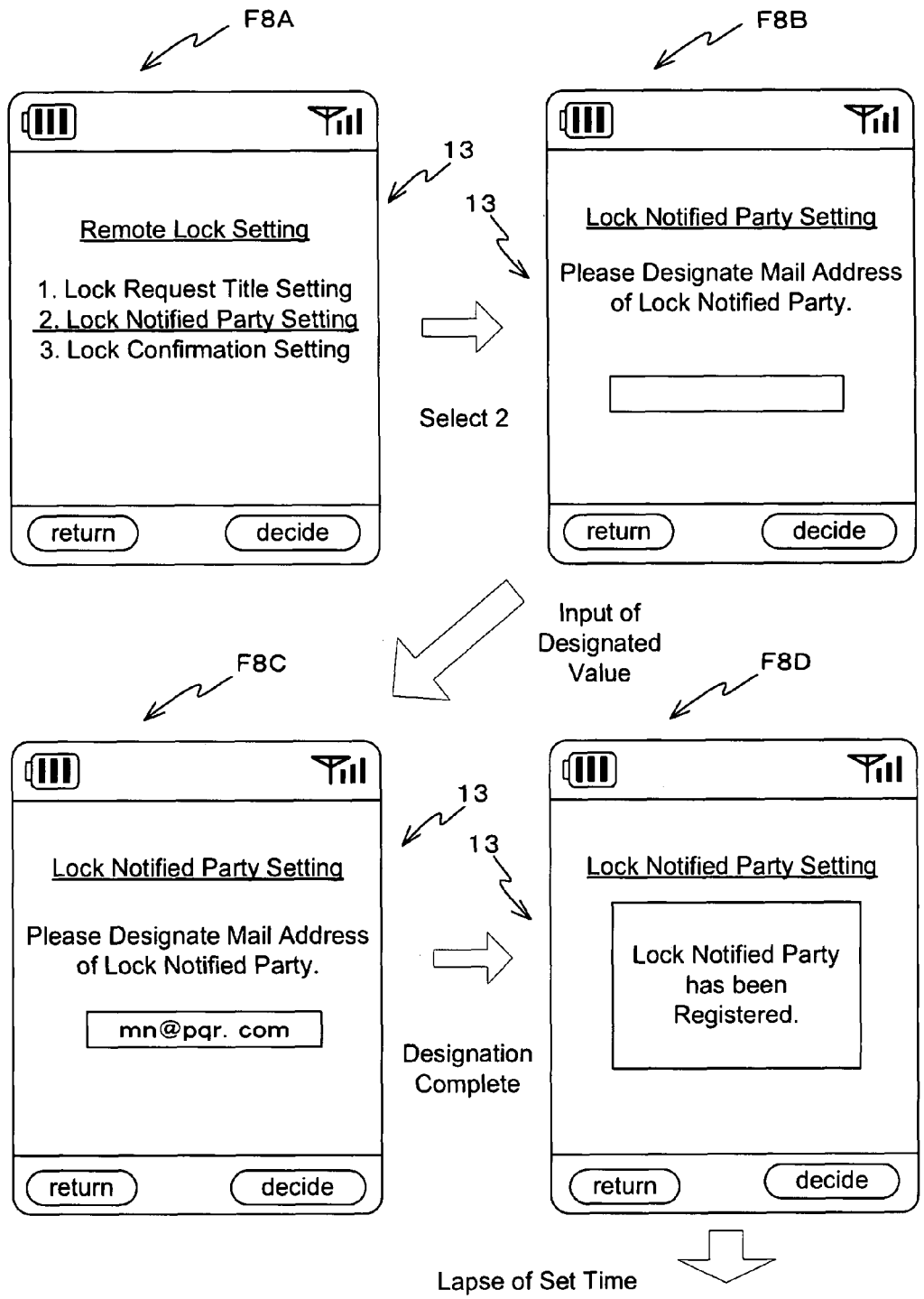
FIG. 8 is the third screen transition diagram for explaining an operation of registering to the terminal registration table of FIG. 4.
Figure 9:
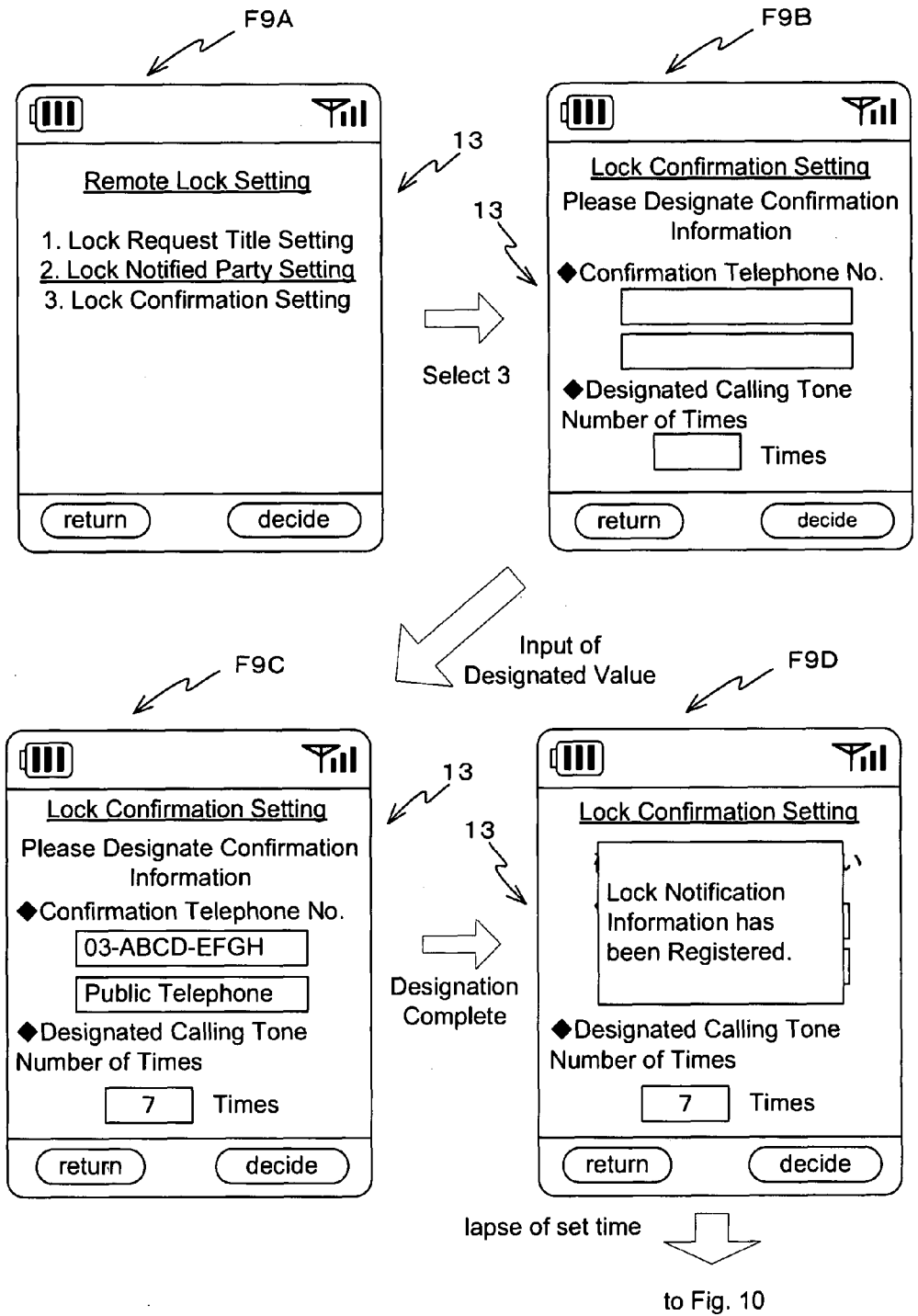
FIG. 9 is the fourth screen transition diagram for explaining an operation of registering to the terminal registration table of FIG. 4.
Figure 10:
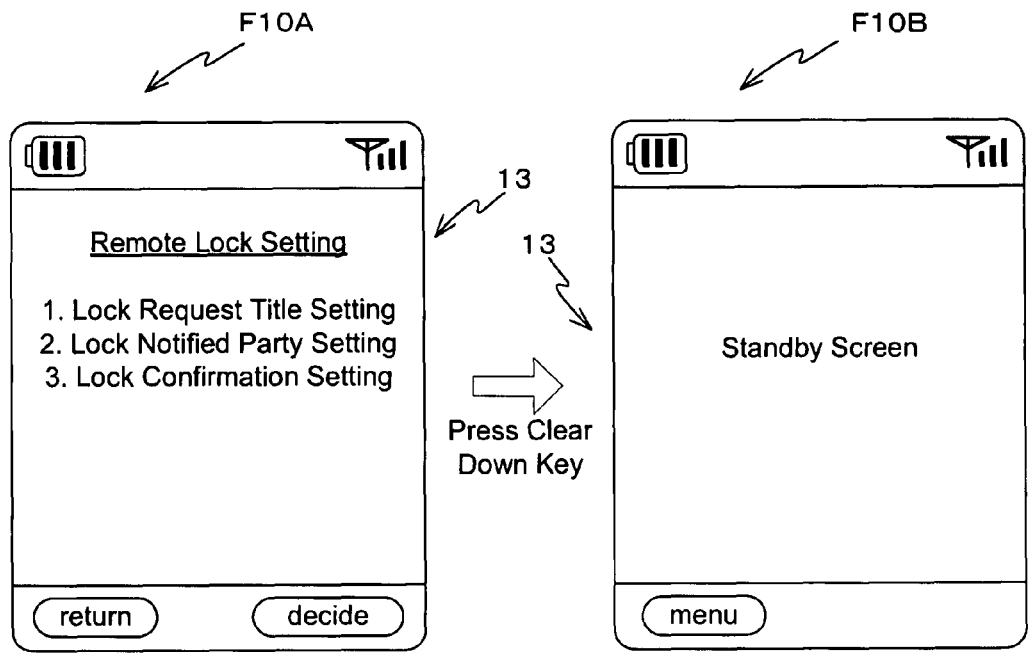
FIG. 10 is the fifth screen transition diagram for explaining an operation of registering to the terminal registration table of FIG. 4.

As shown in FIG. 5, the IC card function section 30 comprises (a) a control section 33 for carrying out control of communication with the control section 21 via a wired communication path and contactless type communication with the reader writer 50 via the antenna 25, as well as overall control of the IC card function section 30, such as reading from and writing to the storage section 34, which will be described later, and (b) a storage section 34 for storing data of the IC card function section 30.

The reader writer 50 shown in FIG. 2A, FIG. 2B and FIG. 5 is a proximity wireless transceiver for carrying out contactless type communication with the IC card function section 30 via the antenna 25.

A registration operation in to the lock control information area 23R will now be described.

When the power supply of the cellular phone unit 10 is turned on, an initialization operation takes place in the cellular phone unit 10, and after that a standby screen as shown by the display F6A is displayed on the display section 13. When the user then inputs menu display commands from the operation section 12 in this state, the menu screen shown in the display F6B is displayed on the display section 13. When the "3. IC card lock settings" is selected by the user from this menus display screen, operation of the lock control information registration section 56 starts, and the IC card lock settings screen shown by display F6C is displayed. Continuing on, when the user selects "2. remote lock setting" from the IC card lock setting screen, the Personal Identification Number (PIN) input screen shown by F6D is displayed.

If the PIN is correctly input by the user in the PIN input screen, the remote lock setting screen shown by the display F7A is displayed. When the user selects "1. lock request title setting" from this remote lock setting screen, the lock request title setting screen shown by F7B is displayed. Continuing on, a lock request mail title, which is a title that a function lock request mail should have to request function lock of the IC card function section 30, is input by the user in the lock request title setting screen. An example of inputting a lock request mail title in this way is shown in the display F7C. In the display F7C, "LOCK0228" is shown as an example input as the lock request mail title.

After input of the lock request mail title in the above-described manner, designation of the lock request mail title is completed upon confirmation by the user. When the lock request mail title designation is completed in this way, it is registered in the lock control information area 23R, and the lock request title setting completion screen shown in display F7D is displayed.

After this, if a set time has elapsed, the above-described remote lock setting screen is displayed, as shown by display F8A. When the user selects "2. lock notified party setting" from this remote lock setting screen, the lock notified party setting screen shown by F8B is displayed. Continuing on, a lock notification mail address, that is mail address of a lock notification mail communication terminal of a lock notified party who should be notified of the fact that the function of the IC card function section 30 has been locked, is input by the user in the lock notified party setting screen. An example of inputting a lock notification mail address in this way is shown in the display F8C. In the display F8C, "mn@pqr.com" is shown as an example input as the lock notification mail address.

After the lock notification mail address has been input in the above-described manner, designation of the lock notification mail address is completed upon confirmation by the user. If the lock notification mail address designation is completed in this way, the mail address is registered in the lock control information area 23R, and the lock request title setting completion screen shown in display F8D is displayed.

After this, if a set time has elapsed the above-described remote lock setting screen is returned to, as shown by display F9A. When the user selects "3. lock confirmation setting" from this remote lock setting screen, the lock confirmation setting screen shown by F9B is displayed. Continuing on, at least one confirmation telephone number, being a telephone number of the above-described confirmation telephone unit, and a designated calling tone number of times for recognizing a confirmation request, are input by the user in the lock confirmation setting screen. An example of inputting a confirmation telephone number and designated calling tone number of times in this way is shown in the display F9C. Note that the display F9C shows an example where a specific telephone number (03-ABCD-EFGH), such as a telephone number of a home telephone, is input as the confirmation telephone number #1, a plurality of telephone numbers having a specific attribute such as public telephone are input as a lock/confirmation telephone number #2 using "public telephone", and "7" times is input as the designated calling tone number of times.

After the notification telephone number and the designated calling tone number of times have been input in the above-described manner, designation of the mail address of the lock notification mail communication terminal is completed upon confirmation by the user. When the lock notification telephone number and designated calling tone number of times designation is completed in this way, they are registered in the lock control information area 23R, and the lock notification setting completion screen shown in display F9D is displayed.

After this, if a set time has elapsed, the above-described remote lock request setting screen is displayed, as shown by display F10A. When a clear key, functioning also as a reset key for returning to the standby screen display state is then pressed, operation of the lock control information registration section 56 is completed and the standby screen is returned to as shown by display F10B.

Incidentally, description has been given for a setting sequence in a case where there is no remote lock setting, but a case where some or all current remote lock request settings are changed, the changed content is designated in the same manner as described above. In the case where remote lock setting has been performed previously, when the above-described screen for remote lock setting is displayed for content change, the registered content in the lock control information area 23R at that time will be displayed in the fields of displays F7B, F8B and F9B.

Next, mainly with reference to FIG. 11, description will be given for an IC card function section 30 remote function lock operation and an IC card function section 30 function lock confirmation operation in the cellular phone unit 10 having the above-described structure and in which the above-described remote lock settings have been carried out.

As a prerequisite, a lock request mail title and a lock notification mail address are registered in the lock control information area 23R. Also, at least one telephone number, as a confirmation telephone number, and a designated calling tone number of times are registered in the lock control information area 23R.

When a user realizes that they have misplaced and lost their cellular phone unit 10, a function lock request electronic mail is sent to the cellular phone unit 10 from a locking mail communication terminal such as a nearby personal computer, as shown in FIG. 11. The title of the lock request electronic mail is made the lock request mail title registered in the cellular phone unit 10.

The remote lock request resulting from such an electronic mail is detected by the lock request detection section 51 of the cellular phone unit 10. At the time of detection, the lock request detection section 51 refers to the lock request mail title registered in the lock control information area 23R, and if the lock request mail title and the title of the received mail match decided that a function lock request mail has been received.

When the remote lock request is detected in this manner, the lock request detection section 51 notifies to this effect to the function lock section 52. The function lock section 52 that has received this notification transmits a function lock instruction to the IC card function section 30 via the card communication section 24 in the event that the IC card function section 30 is operating. The control section 33 receives the function lock instruction in the IC card function section 30. The control section 33 then locks the function of the IC card function section 30 and sends an indication of this fact to the control section 21. Once the function is locked in this way, the control section 33 no longer responds even if a transaction is received from the reader writer 50.

Using the control section 21 the function lock section 52 receives indication of the fact that the function of the IC card function section 30 has been locked. The function lock section 52 that has received this indication then sends indication of the fact that the function of the IC card function section 30 has been locked to the function lock notification section 53. In the event that a lock notification mail address is registered in the lock control information area 23R, the function lock notification section 53 that receives this indication reads out a lock notification mail address from the lock control information area 23R, and reads lock notification mail content (title and text body) for notifying the fact that the IC card function section 30 is in a locked state from the storage section 23. The function lock notification section 53 then sends the lock notification mail as lock notification information via the transceive section 22 and the mobile communication network to the lock notification mail communication terminal having the lock notification mail address. In this manner, after the remote lock request has been detected, the function of the IC card function section 30 is locked, and a lock notification is sent to the lock notification mail communication terminal as an electronic mail.

In this embodiment, when a lock notification mail address is not registered in the lock control information area 23R, the function lock notification section 53 does not send the lock notification mail, and only executes function lock of the IC card function section 30.

Incidentally, in the event that the function of the IC card function section 30 is already locked when the remote lock request is received, the function lock section 52 does not execute the function lock command to the IC card function section 30, but sends indication of the fact that the function of the IC card function section 30 is locked to the function lock notification section 53. The function lock notification section 53 receiving this indication reads out a lock notification mail address from the lock control information area 23R, and also reads out the lock notification mail from the storage section 23. The function lock notification section 53 then sends the lock notification mail via the transceive section 22 and the mobile communication network to the lock notification mail communication terminal having the lock notification mail address. In this case also, when the lock notification mail address is not registered in the lock control information area 23R transmission of the lock notification mail by the function lock notification section 53 is not carried out.

After the function of the IC card function section 30 has been locked in the above-described manner, in the event that a user who can not immediately use the lock notification mail communication terminal wants to quickly confirm that the function of the IC card function section 30 has been locked, the user performs a function lock confirmation request from the confirmation telephone unit to the cellular phone unit 10. This confirmation request is carried out as a result of the user making a call from the confirmation telephone unit to the cellular phone unit 10, and generating calling tone a designated calling tone number of times.

This type of confirmation request is detected by the confirmation request detection section 54 of the cellular phone unit 10. At the time of this detection, the confirmation request detection section 54 detects a confirmation request while referencing the designated calling tone number of times registered in the lock control information area 23R.

When the confirmation request is detected, the confirmation request detection section 54 notifies to this effect to the confirmation information notification section 55. The confirmation information notification section 55 receiving this notification reads out voice guidance data for notifying the fact that the function of the IC card function section 30 is locked using voice from the storage section 23. The confirmation information notification section 55 then sends the voice guidance as confirmation information via the transceive section 22 and the mobile communication network to the lock/confirmation telephone unit that is making a call.

As a result of this, the user who making a call to the cellular phone unit 10 using the confirmation telephone unit can confirm that the function of the IC card function section 30 is locked.

As has been described above, with this embodiment first of all a user of the cellular phone unit 10 registers a title that a lock request electronic mail should have in order to lock function of the IC card function section 30 in a title field of the lock control information area 23R of the cellular phone unit 10. After that, if a lock request electronic mail having the registered title is received, when the IC card function section 30 is in a usable state in the cellular phone unit 10, the function lock section 52 within the control section 21 locks the function of the IC card function section 30 via the wired communication path.

Therefore, according to this embodiment, it is possible to carry out a function lock of an IC card function section 30 contained in a cellular phone 10 with high reliability when the user intends to, even if the cellular phone 10 has been lost.

Also, in the event that the function lock section 52 has locked function of the IC card function section 30, or that a function lock request mail has been received but the IC card function section 30 is already in a function locked state, when a lock notification mail address is registered in the lock control information area 23R, the function lock notification section 53 sends a lock notification mail to the lock notification mail communication terminal having the lock notification mail address. As a result, as long as the lock notification mail address is registered in the lock control information area 23R, it is possible for the user to reliably be made aware of the fact that the function of the IC card function section 30 provided in the cellular phone unit 10 has been locked by referring to the lock notification mail communication terminal.

Also, with this embodiment if a confirmation request for the fact that function of the IC card function section 30 is locked is executed from the confirmation terminal to the cellular phone unit 10 via the mobile communication network, the confirmation request detection section 54 detects the confirmation request. When the confirmation request is detected in this way, the confirmation information notification section 55 transmits confirmation information with content to the effect that the function of the IC card function section 30 is locked to the confirmation terminal. Therefore, after function lock of the IC card function section 30, the user of the cellular phone unit 10 can confirm that the function of the IC card function section 30 is locked in the confirmation terminal used for the confirmation request.

Also, with this embodiment, a telephone number that is an identifier for a confirmation terminal is pre-registered in the lock control information area 23R. This means that it is possible ensure convenience to the user while the user appropriately restricts confirmation request possible originators.

Also, with this embodiment, if the confirmation request detection section 54 detects generation of calling tone more than a designated calling tone number of times after a call is received from the confirmation telephone unit when function of the IC card function section 30 is locked, the fact that there is a confirmation request is recognized. It is therefore possible to confirm that function of the IC card function section 30 of the cellular phone unit 10 that has been lost is locked by the simple operation of generating the calling tone more than a designated calling tone number of times using a calling telephone unit such as a home telephone or a public telephone.

Also, with this embodiment, a voice message is sent to the confirmation telephone unit as confirmation information to the effect that the function of the IC card function section 30 is locked. Therefore, the confirmation information is notified to the confirmation telephone unit in a form that is easy for the user to comprehend.

In addition, with the above-described embodiment, the mail communication terminal that can issue a lock request mail is not particularly limited, and it is possible for an identifier (mail address etc.) of a lock mail communication unit capable of issuing a lock request mail to be registered in the lock control information area 23. In this case, it is possible ensure convenience to the user while the appropriately restricting lock mail communication units.

Also, with the above-described embodiment, decision as to whether or not there is a lock request mail has been carried out by deciding whether or not there is an exact match between the electronic mail title and the lock request electronic mail title registered in the lock control information area 23R, but it is also possible to perform this decision according to whether or not the lock request mail title is included in the electronic mail title.

Also, with the above-described embodiment, the decision as to whether or not there is a lock request mail is carried out based on an electronic mail title, but it can also be carried out based on the text body of the electronic mail. The decision can also be carried out based on the title and text body of the electronic mail.

Also with the above-described embodiment, there is only one lock notification terminal, but there may be a plurality of lock notification terminals.

Also with the above-described embodiment, the confirmation terminal is made a calling telephone unit, but it is also possible to make it a mail communication unit. In this case, electronic mail is used as confirmation information.

Also with the above-described embodiment, the IC card function section 30 is fixedly built into the cellular phone unit 10, and can not be inserted or taken out. On the other hand, as shown comprehensively in FIG. 12A and FIG. 12B, it is also possible to an IC card 30' that operates in the same way as the IC card function section 30, and to use a cellular phone unit 10' that, compared to the cellular phone unit 10 of the above-described embodiment (refer to FIG. 1A and FIG. 1B), is further provided with a card housing section 19 which the IC card 30' can be inserted into or taken out of.

Figure 13:
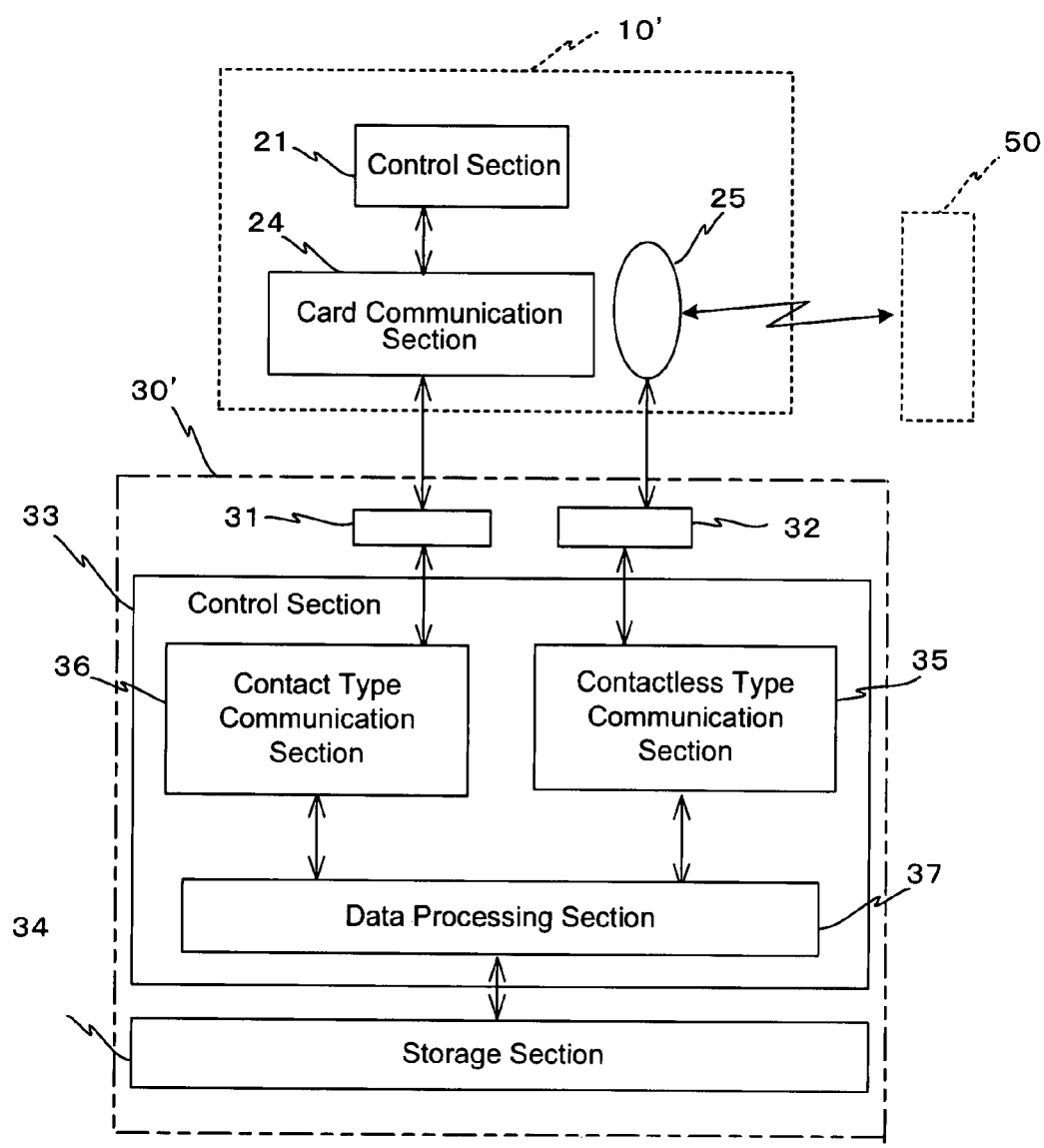
FIG. 13 is a functional block diagram showing the structure of an IC card of FIG. 11.

In this case, as shown in FIG. 13, the IC card 30' is provided with (a) a control section 33 for carrying out control of contact type communication via a contact type communication terminal 31 and control of contactless type communication via a contactless type communication terminal 32, and for carrying out overall control of the IC card, such as read from and writing to a storage section 34, and (b) the storage section 34. In addition, it is possible to adopt a terminal that conforms to the SDIO (Secure Digital Input/Output) card standard as the contact type communication terminal of the IC card 30'. It is also possible for the IC card 30' to adopt an RFID (Radio Frequency-Identification) card from the point of view of contactless type communication.

The control section 33 comprises (i) a contactless type communication section 35 for controlling contactless type communication operation with the reader writer 50, (ii) a contact type communication section 36 for controlling contact type communication with the cellular phone unit 10', and (iii) a data processing section 37 for carrying out data processing, including reading and writing data from and to the storage section 34.

When the IC card 30' is housed in the card housing section 19, the contact type communication terminal 31 is electrically connected to the card communication section 24, and the contactless type communication terminal 32 is electrically connected to the antenna 25. As a result, when the IC card 30' is housed in the card housing section 19, then similarly to the above-described IC card function section 30 communication becomes possible with the cellular phone unit 10' via the wired communication path, and communication is made possible with the reader writer 50 using a contactless type communication.

In FIG. 12A, FIG. 12B and FIG. 13, elements that are the same or equivalent to those in the above-described embodiment have the same reference numerals assigned, and repeat description will be omitted.

Also, in the above-described embodiment, the present invention has been applied to a cellular phone unit, but obviously the present invention may also be applied to mobile communication terminals besides a cellular phone unit.

As has been described above, the method for locking function of the present invention can be applied to control of function lock of a contactless type communication device of a mobile information terminal fitted with the contactless type communication device. Further, the mobile communication terminal of the present invention can be applied to a mobile communication terminal apparatus provided with a contactless type communication device.

What is claimed is:

1. A method for locking function for a contactless type communication device of a mobile communication terminal fitted with the contactless type communication device that is capable of function lock control via a wired communication path, comprising:
   a lock request electronic mail content registration step in which a user of the mobile communication terminal registers, inside the mobile communication terminal, content that at least one of a title field and a text body should have as a lock request electronic mail for locking function of the contactless type communication device;
   a function lock decision step for deciding, in the mobile communication terminal that has received the lock request electronic mail via a mobile communication network, whether or not the contactless type communication device is in a function lock state;
   a function lock state for, when the decision result in the function lock decision step is negative, locking the function of the contactless type communication device in the mobile communication terminal via the wired communication path;
   a notified party registration decision step for, when the decision result in the function lock decision step is affirmative, or when the function lock step has been executed, deciding whether or not a function notified party who should be notified of function lock information to the effect that the contactless type communication device is in a function locked state, is registered in the mobile communication terminal; and
   a function lock notification step in which, when the decision result in the notified party registration decision step is affirmative, the mobile communication terminal notifies the function lock information to the function lock notified party via the mobile communication network.

2. The method for locking function of claim 1, wherein the function lock notified party is a terminal capable of receiving electronic mail, and
   the function lock information is notified from the mobile communication terminal to the function lock notified party using electronic mail.

3. The function lock information notification method of claim 1, further comprising:
   a lock confirmation request step for carrying out, in the mobile communication terminal, a confirmation request for lock of the function from a confirmation terminal via a mobile communications network; and
   a confirmation information transmission step in which the mobile communication terminal sends confirmation information, with content that the function of the contactless type communication device is locked, to the confirmation terminal in response to the confirmation request, when the function of the contactless type communication device is in a locked state.

4. The function lock information notification method of claim 3, wherein the confirmation terminal is a communication terminal having an identifier for a confirmation request possible originator pre-registered in the mobile communication terminal.

5. The function lock information notification method of claim 3, wherein the confirmation terminal has at least one calling telephone unit, and
   the mobile communication terminal, in a state where the function if the contactless type communication device is locked, recognizes that there is a confirmation request upon detection of generation of a calling tone a specified number of times or more after a call is received from the at least one calling telephone unit.

6. The function lock information notification method of claim 5, wherein the confirmation information is a voice message.

7. A mobile communication terminal, fitted with a contactless type communication device capable of function lock control via a wired communication path, comprising:
   lock request electronic mail content registration means for registering, in a function lock control information area within a storage section, content that at least one of a title field and a text body should have as a lock request electronic mail for locking function of the contactless type communication device, in response to an instruction from a user of the mobile communication terminal;
   function lock decision means for deciding, when the lock request electronic mail has been received via a mobile communication network, whether or not the contactless type communication device is in a function lock state;
   function lock means for, when the decision result by the function lock decision means is negative, locking the function of the contactless type communication device via the wired communication path; and
   function lock notification means for, in the event that the result of decision by the function lock decision means is affirmative, or in the event that the function of the contactless type communication device has been locked by the function lock means, when a function lock notified party who should be notified with function lock information to the effect that the contactless type communication device is in a function locked state is registered in the function lock control information area notifying the function lock information to the function lock notified party via the mobile communication network.

8. The mobile communication terminal of claim 7, further comprising:
   lock confirmation request detection means for detecting receipt of a confirmation request for lock of the function from a confirmation terminal via the mobile communications network; and
   confirmation information transmission means for transmitting confirmation information, with content that the function of the contactless type communication device is locked, to the confirmation terminal in response to the confirmation request, when the contactless type communication device is in a function locked state.

9. The mobile communication terminal of claim 8, wherein an identifier for the confirmation terminal is further registered in the function lock control information area.

10. The mobile communication terminal of claim 8, wherein the confirmation terminal has at least one calling telephone unit, and
    the lock confirmation request detecting means is further provided with calling tone confirmation request detection means for recognizing that there is a confirmation request upon detection of generation of a calling tone a specified number of times or more after a call is received from the at least one calling telephone unit, in a state where the function of the contactless type communication device is locked.

11. The mobile communication terminal of claim 10, wherein the confirmation information transmission means transmits voice guidance as the confirmation information.

* * * * *